United States Patent
Stevens et al.

[19]

[11] Patent Number: 5,809,595
[45] Date of Patent: Sep. 22, 1998

[54] FRICTIONALLY VARIANT SEAT PAD

[76] Inventors: James E. Stevens; M. Joyce Stevens, both of P.O. Box 28, New Johnsonville, Tenn. 37134

[21] Appl. No.: 954,623

[22] Filed: Oct. 20, 1997

[51] Int. Cl.⁶ .................................................... A47C 27/00
[52] U.S. Cl. ..................... 5/653; 5/925; 5/926; 297/219.1
[58] Field of Search ................................ 5/653, 654, 652, 5/925, 926, 922, 81.1 HS; 297/219.1

[56] References Cited

U.S. PATENT DOCUMENTS

| | | |
|---|---|---|
| 3,205,514 | 9/1965 | Reynolds . |
| 3,423,774 | 1/1969 | Streetman ................................... 5/925 |
| 3,574,873 | 4/1971 | Weinstein ................................... 5/925 |
| 3,849,813 | 11/1974 | Neilson . |
| 4,164,798 | 8/1979 | Weber ........................................ 5/925 |
| 4,457,032 | 7/1984 | Clarke ........................................ 5/925 |
| 5,111,544 | 5/1992 | Graebe ....................................... 5/925 |
| 5,346,278 | 9/1994 | Dehondt ................................ 297/219.1 |
| 5,465,441 | 11/1995 | Chun ........................................... 5/653 |
| 5,638,558 | 6/1997 | Moore ......................................... 5/925 |

*Primary Examiner*—Alexander Grosz
*Attorney, Agent, or Firm*—Richard C. Litman

[57] ABSTRACT

A frictionally variant seat pad comprising a top member, a bottom member, a polyester filling and a plurality of hook and loop receiving strips. The polyester filling is disposed between the top and bottom member, and the top and bottom member are secured in fixed relation to one another by means of stitching located along the perimeter of both the top and bottom members. The surface of the top member is constructed of satin, which provides a low co-efficient of friction, allowing an individual to easily slide upon the surface. The bottom member is provided with a non-slip, rubberized backing, which, due to the low co-efficient of friction afforded by the non-slip rubberized backing, grips to the surface upon which the frictionally variant seat pad rests, thereby preventing movement of the frictionally variant seat pad.

3 Claims, 2 Drawing Sheets

FRICTIONALLY VARIANT SEAT PAD

BACKGROUND OF THE INVENTION

1. Field of the Invention

The present invention relates to seat pads in general and, more particularly, to a frictionally variant seat pad for an automobile having a top surface of satin and a non-slip, rubberized bottom surface.

2. Description of the Related Art

The typical automobile seat is configured in a manner that does not allow for easy exit and entry from the door of an automobile. In addition, most automobile seats are covered by a highly frictional material, which causes even more difficulty for an individual attempting to exit or enter an automobile seat. This extreme difficulty of movement caused by the aforementioned problems often leads an individual to attempt to forcibly get in or out of an automobile seat, potentially leading to injury of the individual or damage to the automobile. There have been no prior attempts to create a device for an automobile seat that would put an individual in contact with a surface having a low co-efficient of friction so that the individual would have greatly improved mobility in the entering and exiting of an automobile seat.

It would be useful, then, for the automobile user to posses a frictionally variant seating pad that would maintain secure frictional engagement with an automobile seat while furnishing a surface having a low co-efficient of friction, thus permitting an individual to easily and effectively get in and out of an automobile seat.

There are several examples of relevant art that include some but not all of the structural or functional characteristics of the present invention. U.S. Pat. No. 5,465,441 issued to Chun discloses a seating member having a bottom surface with a low co-efficient of friction, a top surface with a high co-efficient of friction and a pad disposed between the top and bottom surface. The top surface of the seating member grips to the clothing of a user, while the bottom surface of the seating member slides on a support surface for the seating member. In Clarke's U.S. Pat. No. 4,457,032 a portable, auxiliary seat cushion is shown having a seat panel and a back rest panel composed of a flexible, resilient synthetic plastic foam having a high co-efficient of friction. U.S. Pat. No. 5,346,278 issued to Dehondt teaches a non-slip high chair cushion having globules of rubbery polymeric material deposited on a scrim fabric, which prevent an infant from sliding forwardly out of a high chair.

Two additional patents related to the present invention are U.S. Pat. No. 3,205,514 issued to Reynolds and U.S. Pat. No. 3,574,873 issued to Weinstein. Reynolds' Patent discloses a tubular protective covering for bedding having a smooth anti-frictional upper surface and a plurality of frictional areas disposed on the lower surface of the bedding to prevent slippage of the tubular protective covering. In Weinstein's Patent, a cushion is shown having a unique displacement matrix over which a cover of a material whose surface has a low co-efficient of friction.

None of the above inventions and patents, taken either singularly or in combination, is seen to describe the instant invention as claimed. Thus a frictionally variant seat pad solving the aforementioned problems is desired.

SUMMARY OF THE INVENTION

The present invention is a frictionally variant seat pad comprising a top member, a bottom member, a polyester filling and a plurality of hook and loop receiving strips. The frictionally variant seat pad is principally for use in an automobile in order to facilitate ease of entering and exiting an automobile seat. This improved ease in the entering and exiting of an automobile seat is achieved through the structure, material, and disposition of the frictionally variant seat pad.

The upper surface of the top member is constructed of satin, which provides the upper surface of the top member with a low co-efficient of friction. Due to the low co-efficient of friction provided by the upper surface of the top member a user can easily slide upon the upper surface. The bottom surface of the bottom member consists of a rubberized, non-slip backing, which provides the bottom member with a high co-efficient of friction. The high co-efficient of friction provided by the bottom surface of the bottom member grips readily to almost any seat surface, thereby securing the frictionally variant seat pad in a fixed position during use.

Disposed between the top member and the bottom member is a polyester filling. The polyester filling provides a padding for the user which contours to the dimensions of the user. A single seam is stitched around the perimeter of both the top and bottom member of the frictionally variant seat pad, enclosing the polyester filling between the top and bottom member. This provides an integral unit that prevents slippage between the three sections of the frictionally variant seat pad.

Proximal the edges of the bottom surface of the bottom member are a plurality of Velcro receiving strips. These Velcro receiving strips provide an additional means of securement for the frictionally variant seat pad when used upon a cloth covered automobile seat. The frictionally variant seat pad can, however, be placed on any type of seat regardless of the material.

Accordingly, it is a principal object of the invention to provide a frictionally variant seat pad which has a top surface with a low co-efficient of friction and a bottom surface with a high co-efficient of friction.

It is another object of the invention to provide a frictionally variant seat pad which includes a polyester filling that contours to the shape of a user.

It is a further object of the invention to provide a frictionally variant seat pad constructed as an integral unit.

Still another object of the invention is to provide a frictionally variant seat pad including a plurality of hook and loop fastening strips.

It is an object of the invention to provide improved elements and arrangements thereof in a frictionally variant seat pad for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
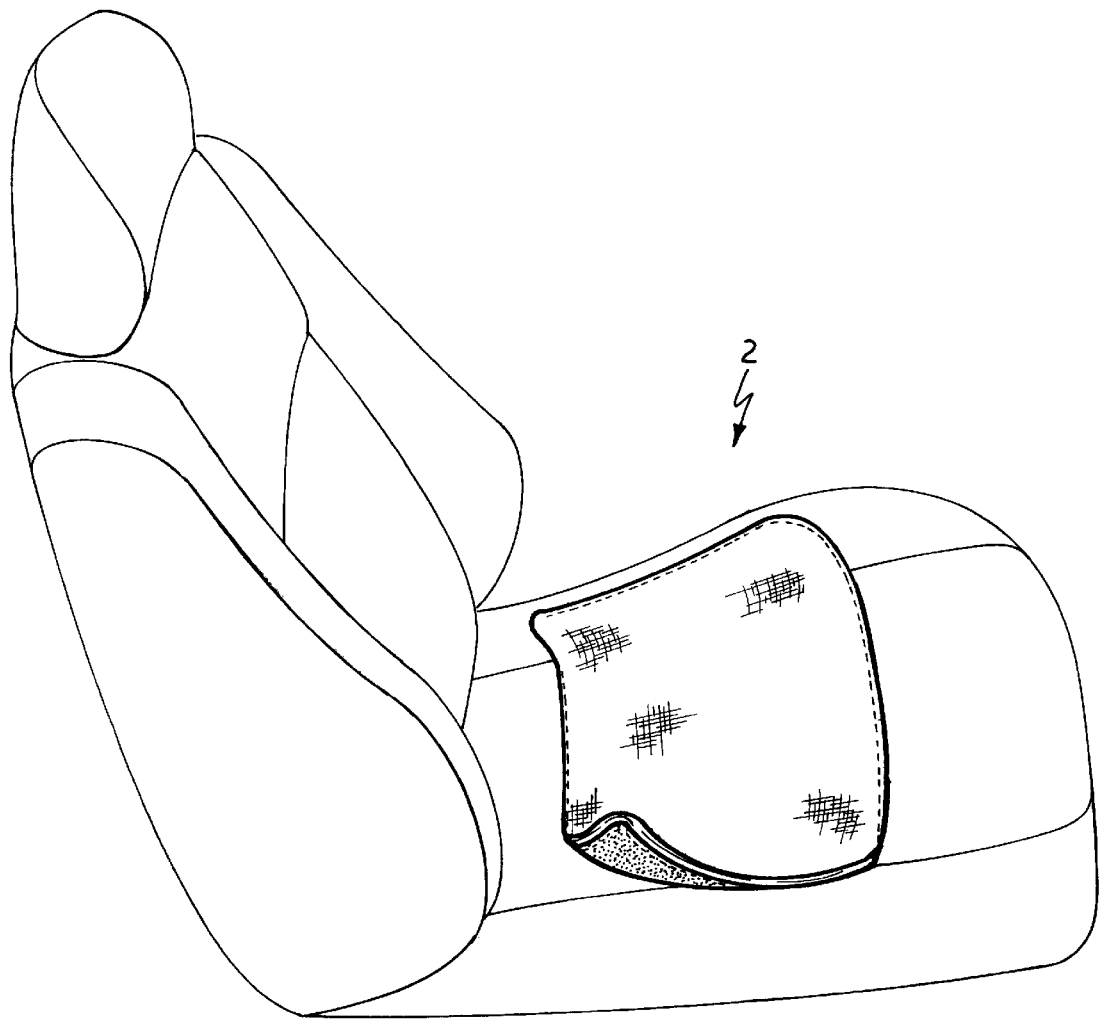
FIG. 1 is an environmental, perspective view of a frictionally variant seat pad according to the present invention.
Figure 2:
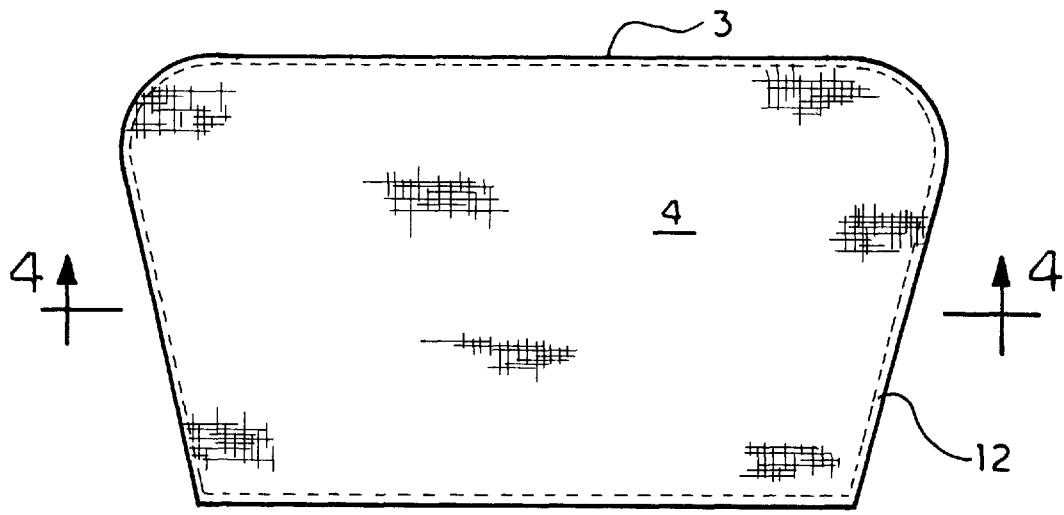
FIG. 2 is a top view of the top member of the frictionally variant seat pad.
Figure 3:
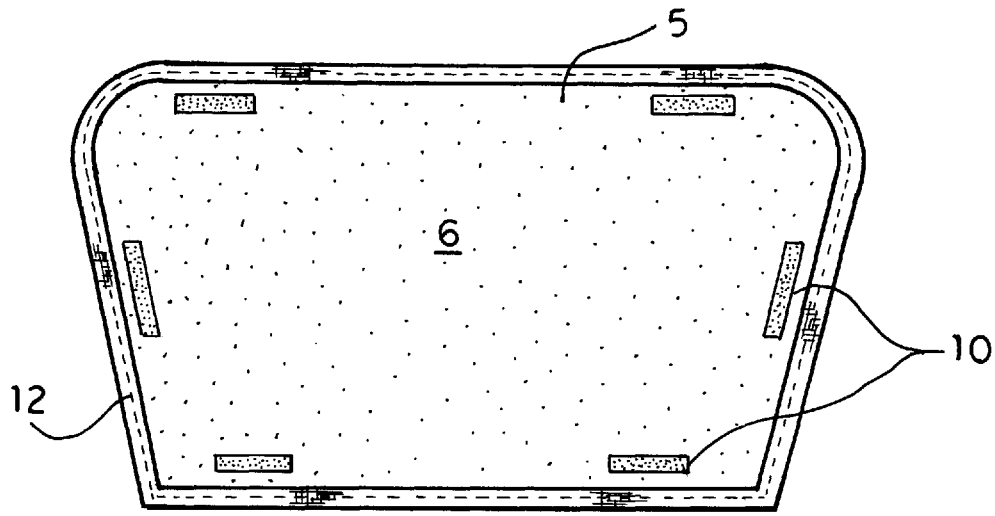
FIG. 3 is a top view of the bottom member of the frictionally variant seat pad.

The present invention, as best seen in FIG. 1, is a frictionally variant seat pad 2 of unitary construction, and comprises a top member 3, a bottom member 5 and a polyester filling 8 disposed between the top member 3 and the bottom member 5. The top member 3 of the frictionally variant seat pad 2, most clearly seen in FIG. 2, includes a satin surface 4, which provides the top member 3 of the frictionally variant seat pad 2 with an extremely low co-efficient of friction. The bottom member 5 of the frictionally variant seat pad 2, as seen in FIG. 3, includes a rubberized, non-slip backing 6, which provides the bottom member 5 with an extremely high co-efficient of friction.

Figure 4:
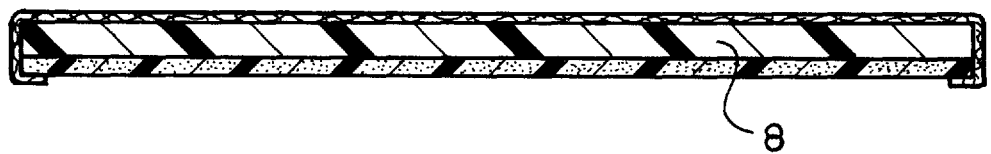
FIG. 4 is a cross-section of the frictionally variant seat pad of FIG. 2.

The top member 3 and the bottom member 5 are attached to one another along their outer perimeters by means of a single stitch 12. A polyester filling 8, shown in cross-section in FIG. 4, that permits the frictionally variant seat pad 2 to conform to the shape of a user is disposed between the top member 3 and the bottom member 5. The single stitch 12 positively secures the top member 4, bottom member 5 and polyester filling 8 to one another, thereby forming an integral unit.

The rubberized, non-slip backing 6 of the bottom element 5 includes a plurality of hook and loop receiving strips 10 located proximal the edge of the rubberized, non-slip backing 6. These strips, when used on a fabric surface, provide an additional means of securement of the bottom member 5 of the frictionally variant seat pad 2 to the surface of a seat. The rubberized, non-slip backing 6 functions to secure the frictionally variant seat pad 2 to the surface of a seat, while the satin surface 4 allows a user to easily slide upon the top member 3 of the frictionally variant seat pad 2.

The frictionally variant seat pad may be utilized on any seat surface, but is specifically adapted to be used in an automobile seat. Accordingly, the frictionally variant seat pad 2 may be constructed in a variety of colors in order to correspond with the color of the fabric on a particular automobile seat. Due to the pliable nature and integral construction of the frictionally variant seat pad 2, the frictionally variant seat pad 2 may be easily rolled up and transported.

It is to be understood that the present invention is not limited to the embodiment described above, but encompasses any and all embodiments within the scope of the following claims.

We claim:

1. A frictionally variant seat pad comprising:

a top member having a surface comprised of satin and a first, a second, a third and a fourth edge;

a bottom member including a rubberized, non-slip backing, and a first, a second, a third and a fourth edge, and at least one hook and loop receiving strip;

a polyester filling disposed between said top member and said bottom member;

a fastening means which secures said top member and said bottom member to one another in fixed relation, and thereby defining a cavity to contain said polyester filling;

wherein said surface of said top member provides a low co-efficient of friction, thereby enabling a user to slide upon said surface, and said rubberized, non-slip backing provides a high co-efficient of friction, thereby gripping to the surface upon which it is resting.

2. The frictionally variant seat pad as defined in claim 1 wherein a plurality of hook and loop receiving strips are positioned on said rubberized, non-slip backing proximal said first, said second, said third and said fourth edges of said bottom member of said frictionally variant seat pad.

3. The frictionally variant seat pad as defined in claim 1 wherein the frictionally variant seat pad is constructed in a variety of colors in order to correspond with the color of the seat in which it is used.

* * * * *